United States Patent
VanDruten et al.

(10) Patent No.: US 8,925,666 B2
(45) Date of Patent: Jan. 6, 2015

(54) FLYWHEEL MODULE COMPRISING A CENTRIFUGAL DISENGAGING CLUTCH

(75) Inventors: Roëll Marie VanDruten, Eindhoven (NL); Alexander Franciscus Anita Serrarens, Waalre (NL); Bas Gerard Vroemen, Eindhoven (NL)

(73) Assignee: DTI Group, BV, Eindhoven (NL)

( * ) Notice: Subject to any disclaimer, the term of this patent is extended or adjusted under 35 U.S.C. 154(b) by 223 days.

(21) Appl. No.: 13/510,251

(22) PCT Filed: Nov. 19, 2010

(86) PCT No.: PCT/NL2010/050779
§ 371 (c)(1),
(2), (4) Date: Jul. 9, 2012

(87) PCT Pub. No.: WO2011/062496
PCT Pub. Date: May 26, 2011

(65) Prior Publication Data
US 2012/0273320 A1    Nov. 1, 2012

(30) Foreign Application Priority Data

Nov. 19, 2009 (NL) ...................... 2003827
Oct. 6, 2010 (NL) ...................... 2005471

(51) Int. Cl.
| | |
|---|---|
| *B60K 6/10* | (2006.01) |
| *B60K 6/387* | (2007.10) |
| *F16D 43/06* | (2006.01) |
| *F16H 35/10* | (2006.01) |
| *B60K 6/383* | (2007.10) |
| *F16F 15/131* | (2006.01) |
| *F16F 15/315* | (2006.01) |
| *F16H 33/02* | (2006.01) |

(52) U.S. Cl.
CPC ............... *F16H 35/10* (2013.01); *B60K 6/105* (2013.01); *B60K 6/383* (2013.01); *F16F 15/13135* (2013.01); *F16F 15/315* (2013.01); *F16H 33/02* (2013.01); *B60L 2260/14* (2013.01); *Y02T 10/6204* (2013.01); *Y02T 10/6282* (2013.01)
USPC ....... 180/165; 74/572.1; 192/48.3; 192/104 R

(58) Field of Classification Search
USPC .......................................................... 74/572.1
See application file for complete search history.

(56) References Cited

U.S. PATENT DOCUMENTS 3,926,288 A * 12/1975 Nerstad ................. 192/104 F
4,116,006 A * 9/1978 Wallis ..................... 74/572.1
4,499,965 A * 2/1985 Oetting et al. ............ 180/165
(Continued)

FOREIGN PATENT DOCUMENTS

DE 198 28 844 1/1999
EP 0 061 276 9/1982
(Continued)

*Primary Examiner* — Rodney H Bonck
(74) *Attorney, Agent, or Firm* — Eric Karich

(57) ABSTRACT

A flywheel module has a closed housing with an opening, and an output which is formed by an output shaft that extends outward through the opening. A sealing ring is present between the output shaft and the boundary wall of the opening. A flywheel is accommodated in the housing, which flywheel is connected via a clutch to a first gear of a transmission whose other gear is connected to a first portion of a centrifugal disengaging clutch of which the other portion is connected to the output shaft. With this it be avoided that the flywheel starts to run at too high a speed, which guarantees the safety of the flywheel module.

4 Claims, 2 Drawing Sheets

(56) References Cited

U.S. PATENT DOCUMENTS 4,519,485 A * 5/1985 Greenwood .............. 192/103 R
4,687,085 A * 8/1987 Shimizu et al. ........... 192/104 C
7,416,039 B1 * 8/2008 Anderson et al. ............. 180/165

FOREIGN PATENT DOCUMENTS

EP        0 119 793       9/1984
GB       2 018 391 A * 10/1979

* cited by examiner

FLYWHEEL MODULE COMPRISING A CENTRIFUGAL DISENGAGING CLUTCH

CROSS-REFERENCE TO RELATED APPLICATIONS

This application for a utility patent is a continuation of a previously filed utility patent application, now abandoned, having the application number PCT/NL2010/050779, filed 19 Nov. 2010.

FIELD OF THE INVENTION

The invention relates to a flywheel module comprising at least one flywheel and an output, which can be connected to a drive line. The output is, for example, a shaft to which the flywheel is fixed.

State of The Art

A flywheel module of this type is generally known. When applying the flywheel module, care should be taken for safety's sake that the flywheel does not start rotating at too high a speed

SUMMARY OF THE INVENTION

It is an object of the invention to provide a flywheel module of the type defined in the opening paragraph with which safety is ensured. For this purpose, the flywheel module according to the invention is characterized in that a centrifugal disengaging clutch is present between the output and the flywheel and opens beyond a certain speed. As a result, it is avoided that the flywheel is revved up to beyond a maximum speed where there is too great a chance of the flywheel breaking down.

The centrifugal disengaging clutch preferably comprises two clutch parts which are each provided with at least one friction surface, which friction surfaces work in conjunction and which centrifugal disengaging clutch comprises a housing that rotates along with one of the clutch parts and is disengaged from the other clutch part.

An embodiment of the flywheel module according to the invention is characterized in that the flywheel module comprises a housing which accommodates the flywheel, where the shaft to which the flywheel is fixed is sealed with respect to the housing and where there is an under pressure in the housing. The under pressure in the housing is preferably not less than 50 millibars. This reduces the air resistance loss and less energy is needed for revving up the flywheel and maintaining it at the right speed To provide that a revved up flywheel revs down in the slowest way possible if no energy is needed, a further embodiment of the flywheel module according to the invention is characterized in that the flywheel module comprises a clutch which is present between the centrifugal disengaging clutch and the flywheel. The clutch is preferably positioned in the housing so that, when flywheel is disengaged, the friction losses in the place of the sealing do not have any effect on the flywheel.

Yet another embodiment of the flywheel module according to the invention is characterized in that the flywheel module comprises a transmission which is present between the centrifugal disengaging clutch and the flywheel. As a result, the flywheel can be revved up to a higher speed by an external drive source.

The transmission is preferably present inside the housing so that it also suffers the least possible from the air resistance. Furthermore, also the centrifugal disengaging clutch is preferably present inside the flywheel housing for a reduction of the air resistance.

The invention also relates to a driving mechanism comprising a drive source with an output shaft, as well as a flywheel module according to the invention, in which the output of the flywheel module is connected to the output shaft of the drive source. The drive source is formed, for example, by a combustion engine.

Between the output and the drive source there is preferably a further transmission present and/or a further clutch.

BRIEF DESCRIPTION OF THE DRAWINGS

The invention will be further described below in more detail with reference to examples of embodiment of the flywheel module and the driving mechanism according to the invention and represented in the drawing figures, in which.

DETAILED DESCRIPTION OF THE DRAWINGS

Figure 1:
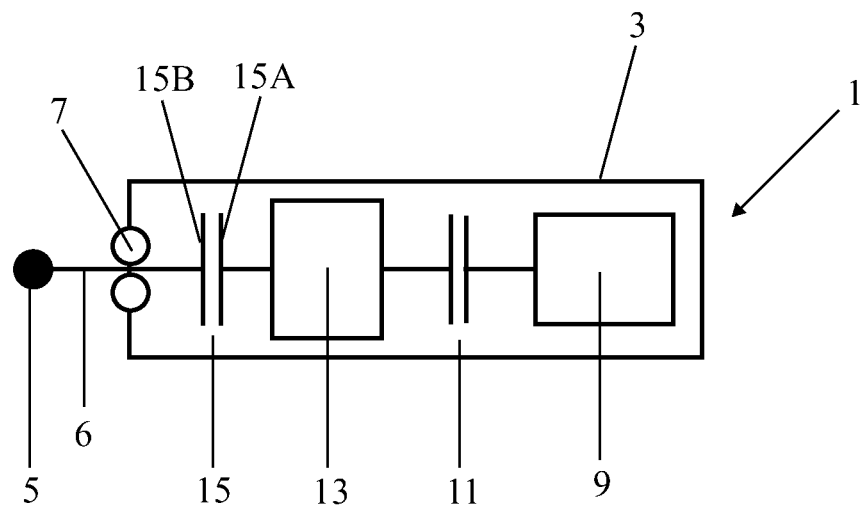
FIG. 1 shows in a diagrammatic manner an embodiment of the flywheel module according to the invention.

FIG. 1 shows in a diagrammatic manner an embodiment of the flywheel module according to the invention. The flywheel module 1 has a closed housing 3 provided with an opening, and an output 5 which is formed by an output shaft 6 that extends outward through the opening. A sealing ring 7 is present between the output shaft and the bounding wall of the opening. Inside the housing 3 there is a flywheel 9 that is connected via a clutch 11 to a first gear of a transmission 13 of which the other gear is connected to a first part 15A of a centrifugal disengaging clutch 15 whose other part 15B is connected to the output shaft 6.

Figure 2:
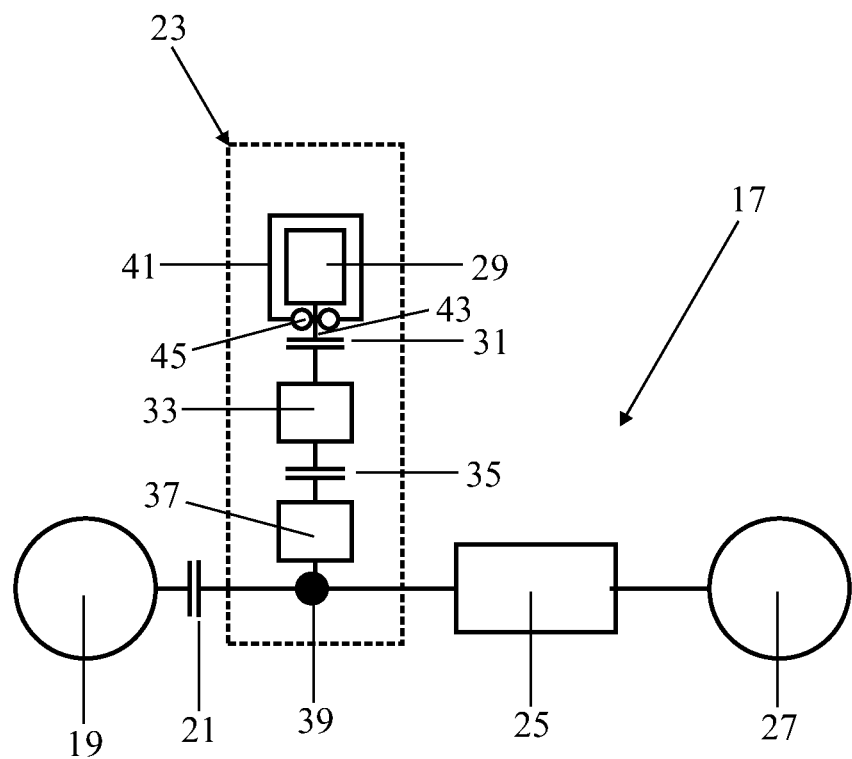
FIG. 2 shows in a diagrammatic manner a driving mechanism comprising a second embodiment of the flywheel module according to the invention.

FIG. 2 shows in a diagrammatic manner a driving mechanism 17 which comprises a second embodiment of the flywheel module according to the invention. The driving mechanism 17 comprises a drive source 19 which is connected via a further clutch 21 to the flywheel module 23 and to an input shaft of a transmission 25. This transmission further includes an output shaft which is connected to wheels 27 of a vehicle.

The flywheel module 23 has a flywheel 29 which is connected via a clutch 31 to a transmission 33 which is connected to a centrifugal disengaging clutch 35. This centrifugal disengaging clutch is connected to a further transmission 37 which is connected to the output 39. The flywheel 29 is present in a closed housing 41 which has an opening through which a shaft 43 extends to which the flywheel 29 is fixed. A sealing 45 is present between the shaft 43 and the housing 41. There is underpressure inside the housing.

Figure 3:
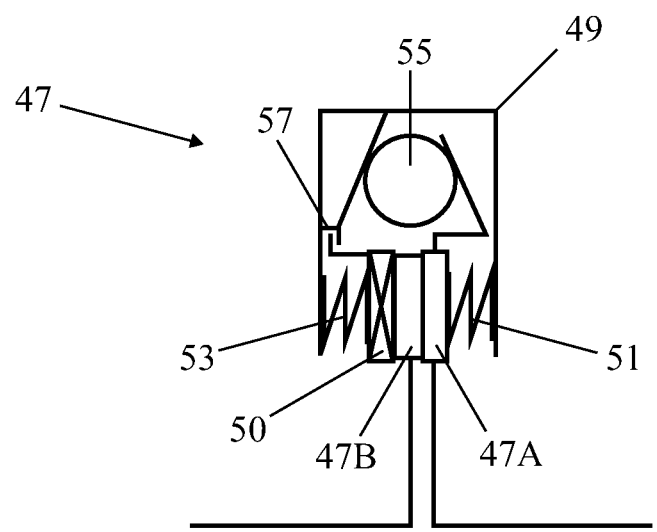
FIG. 3 shows a first embodiment of the centrifugal disengaging clutch.

FIG. 3 shows a first embodiment of a centrifugal disengaging clutch which may be used in the flywheel modules shown in FIGS. 1 and 2. The centrifugal disengaging clutch 47 comprises two clutch parts 47A and 47B which each have a friction surface via which the torque is transmitted when the disengaging clutch is closed. Clutch part 47B is present on the side of the flywheel and clutch part 47A is present on the side of the drive line.

The centrifugal disengaging clutch comprises a housing 49 that rotates along with the clutch part 47A and is disengaged from the other clutch part 47B as a result of the presence of a pivot bearing 50. The disengaging clutch 47 is closed by means of the pre-tension exerted on the clutch parts by the springs 51 and 53.

If the speed rises, a ball 55 pushes the clutch part 47A and the housing 49 towards each other as a result of the centrifugal force. In consequence, spring 53 meets the position boundary 57. As a result, spring 53 is no longer capable of exerting any force on clutch part 47B and thus the thrust force on the friction surfaces disappears. The clutch is open now.

Springs 51 and 53 are placed in the housing 49 with a slight pre-tension. As a result, the normal force on the friction surfaces hardly changes when the play of the position boundary 57 is used up. However, if the play is used up completely, the normal force suddenly drops off An advantage of this construction is that the transition from closed to open clutch and vice versa takes place very abruptly so that the slipping time is very brief. This is advantageous for the wear and heating up of the clutch, which is minimized as a result.

Figure 4:
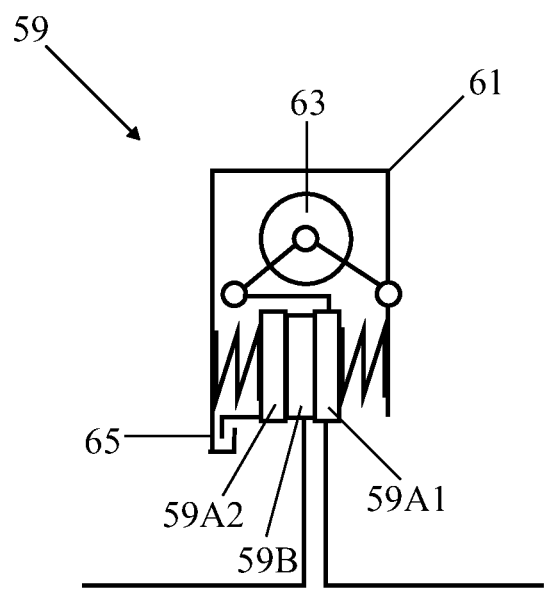
FIG. 4 shows a second embodiment of the centrifugal disengaging clutch.

FIG. 4 shows a second embodiment of a centrifugal disengaging clutch 59. The first clutch part here comprises two parts 59A1 and 59A2 which are in frictional contact with the second clutch part 59B. The housing 61 rotates along with the parts 59A1 and 59A2 and is disengaged from clutch part 59B by means of the friction surfaces. Parts 59A1 and 59A2 as well as the housing 61 are pressed together by a ball 63 which is pressed outward as a result of the centrifugal force. This causes a centrifugal disengaging clutch to develop which opens and closes within a very small rotation window. This rotation window can be adjusted by means of the play in the position boundary 65 or the magnitude of the centrifugal force. In this way over-revving of the flywheel can be avoided, which guarantees the safety of the system.

Albeit the invention has been described in the foregoing with reference to the drawing Figures, it should be pointed out that the invention is not by any manner or means restricted to the embodiments shown in the drawing Figures. The invention also extends over any embodiments deviating from the embodiments shown in the drawing Figures within the spirit and scope defined by the claims.

We claim:

1. A flywheel module comprising at least one flywheel and an output, which can be connected to a drive line, characterized in that a centrifugal disengaging clutch between the output and the flywheel which opens beyond a certain speed,
    wherein the flywheel module comprises a housing which accommodates the flywheel, wherein a shaft to which the flywheel is fixed is sealed with respect to the housing, and wherein there is an under pressure in the housing;
    wherein the flywheel module comprises a clutch which is present between the centrifugal disengaging clutch and the flywheel; and
    wherein the clutch is accommodated in the housing.

2. A flywheel module as claimed in claim 1, characterized in that the centrifugal disengaging clutch preferably comprises two clutch parts which are each provided with at least one friction surface, which friction surface work in conjunction and which centrifugal disengaging clutch rotates along with one of the clutch parts and is disengaged from the other clutch part.

3. A flywheel module as claimed in any one of the preceding claims, characterized in that the flywheel module comprises a transmission which is present between the centrifugal disengaging clutch and the flywheel.

4. A flywheel module as claimed in claim 3, characterized in that the transmission is accommodated in the housing.

* * * * *